United States Patent
Hoefte et al.

(10) Patent No.: US 9,504,363 B2
(45) Date of Patent: Nov. 29, 2016

(54) WET/DRY SHEET DISPENSER WITH DISPENSING CUP

(71) Applicant: The Procter & Gamble Company, Cincinnati, OH (US)

(72) Inventors: Paulus Antonius Augustinus Hoefte, Astene (BE); Kris Adriaenssens, Boortmeerbeek (BE); Annick Hilda Rose Coenen, Heverlee (BE); An Jozefien De Coninck, Eppegem (BE)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 14/310,023

(22) Filed: Jun. 20, 2014

(65) Prior Publication Data

US 2015/0366416 A1  Dec. 24, 2015

(51) Int. Cl.
| | |
|---|---|
| *A47K 10/38* | (2006.01) |
| *B05B 11/00* | (2006.01) |
| *A47K 5/12* | (2006.01) |
| *B05B 15/04* | (2006.01) |
| *A47K 10/32* | (2006.01) |

(Continued)

(52) U.S. Cl.
CPC .......... *A47K 10/38* (2013.01); *A47K 5/1205* (2013.01); *A47K 10/32* (2013.01); *B05B 11/0043* (2013.01); *B05B 11/0048* (2013.01); *B05B 11/0054* (2013.01); *B05B 11/3001* (2013.01); *B05B 15/0406* (2013.01); *A47K 2010/3273* (2013.01); *B05B 1/14* (2013.01); *B05B 9/0403* (2013.01); *B05B 11/0056* (2013.01); *B05B 12/12* (2013.01); *B05B 15/061* (2013.01)

(58) Field of Classification Search
CPC ............... A47K 10/24; A47K 10/42; A47K 2010/3273; A47K 2010/328; A47K 2010/3286; A47K 10/32; A47K 10/38; A47K 5/1205; B05B 15/04; B05B 1/14; B05B 1/28; B05B 11/0043; B05B 11/0048; B05B 11/0054; B05B 11/0056; B05B 11/3001; B05B 12/12; B05B 15/0406; B05B 15/00; B65D 83/0011
See application file for complete search history.

(56) References Cited

U.S. PATENT DOCUMENTS

| | | |
|---|---|---|
| 3,804,061 A | 4/1974 | Cassar et al. |
| 3,865,271 A | 2/1975 | Gold |

(Continued)

FOREIGN PATENT DOCUMENTS

| | | |
|---|---|---|
| CN | 2172081 Y | 7/1994 |
| CN | 101156755 A | 4/2008 |

(Continued)

OTHER PUBLICATIONS

U.S. Appl. No. 14/151,937, filed Jan. 10, 2014, Hoefte, et al.

*Primary Examiner* — Frederick C Nicolas
*Assistant Examiner* — Bob Zadeh
(74) *Attorney, Agent, or Firm* — Larry L. Huston; Steven W. Miller (57) ABSTRACT

A wet/dry sheet dispenser. The dispenser has an elongate refill which holds a liquid and fits into a complementary base. Liquid is selectively dispensed from the refill by longitudinal activation of a pump. The pump may be disposed on either the refill or base. Liquid flows from the refill, upwardly to a dispensing cup. The user may then, optionally, take a sheet and wet it with liquid from the cup at the point of use. This arrangement allows for convenient and selective one hand pump operation, so the other hand is free to grasp the sheet. The sheet may be used wet or dry as desired at the point of use.

6 Claims, 6 Drawing Sheets

(51) Int. Cl.
*B05B 1/14* (2006.01)
*B05B 9/04* (2006.01)
*B05B 12/12* (2006.01)
*B05B 15/06* (2006.01)

(56) References Cited

U.S. PATENT DOCUMENTS

| | | | |
|---|---|---|---|
| 4,106,433 A | | 8/1978 | Asokan et al. |
| 4,436,224 A | * | 3/1984 | McInerny ............... A47K 10/32 221/96 |
| 4,620,502 A | | 11/1986 | Kimble |
| 4,667,846 A | | 5/1987 | Marceau |
| 4,747,365 A | | 5/1988 | Tusch |
| 4,757,922 A | * | 7/1988 | Landecker ............. A45D 34/00 222/205 |
| 4,798,312 A | | 1/1989 | Scheiber |
| 4,901,889 A | * | 2/1990 | Mitchell ................ A47K 10/32 222/153.11 |
| 5,433,084 A | | 7/1995 | Kaiser et al. |
| 5,671,872 A | | 9/1997 | Daniels, Jr. |
| 5,672,206 A | | 9/1997 | Gorman |
| 5,762,710 A | | 6/1998 | Looman et al. |
| 5,819,989 A | | 10/1998 | Saraceni |
| 5,829,278 A | | 11/1998 | Koo |
| 5,887,759 A | * | 3/1999 | Ayigbe ................... A47K 10/32 118/325 |
| 6,059,882 A | | 5/2000 | Steinhardt et al. |
| 6,138,874 A | | 10/2000 | Audrey |
| 6,314,971 B1 | | 11/2001 | Schneider et al. |
| 6,319,318 B1 | | 11/2001 | Pekarek et al. |
| 6,321,937 B1 | * | 11/2001 | DeSimone ......... A47K 10/3818 221/45 |
| 6,343,491 B1 | | 2/2002 | Jung |
| 6,346,153 B1 | | 2/2002 | Kamps et al. |
| 6,431,111 B1 | | 8/2002 | Zhang |
| 6,431,405 B2 | | 8/2002 | Irwin |
| 6,457,434 B1 | | 10/2002 | Lazar |
| 6,497,345 B1 | | 12/2002 | Wilker et al. |
| 6,547,881 B1 | | 4/2003 | Kloeckner |
| 6,613,144 B1 | | 9/2003 | Loertscher et al. |
| 6,918,513 B1 | | 7/2005 | Downey |
| 7,018,473 B2 | | 3/2006 | Shadrach |
| 7,185,841 B2 | | 3/2007 | Kaufmann |
| 7,318,949 B2 | | 1/2008 | Shadrach |
| 7,654,412 B2 | | 2/2010 | Amundson et al. |
| 7,740,154 B2 | * | 6/2010 | Kennedy ............. B05B 11/0005 222/205 |
| 7,784,424 B2 | | 8/2010 | Wentworth et al. |
| 7,850,041 B2 | | 12/2010 | Amundson et al. |
| 7,856,941 B2 | | 12/2010 | Nelson et al. |
| 8,006,864 B2 | | 8/2011 | Fryan et al. |
| 2003/0089554 A1 | * | 5/2003 | Alan Ralph ........ B05B 11/3001 184/19 |
| 2006/0137106 A1 | * | 6/2006 | Goodman ............. B05C 17/002 8/148 |
| 2007/0034650 A1 | * | 2/2007 | Pulch .................. B05B 11/0005 222/192 |
| 2007/0272701 A1 | | 11/2007 | Carlsson et al. |
| 2008/0011782 A1 | | 1/2008 | Sidman |
| 2008/0314925 A1 | * | 12/2008 | Kennedy ............. B05B 15/0406 222/109 |
| 2009/0031952 A1 | | 2/2009 | Lazar |
| 2009/0032636 A1 | | 2/2009 | Orlandi et al. |
| 2009/0302049 A1 | | 12/2009 | Cornell |
| 2010/0032443 A1 | | 2/2010 | Mueller et al. |
| 2011/0088619 A1 | | 4/2011 | Duerrstein et al. |
| 2011/0315715 A1 | | 12/2011 | Ophardt |
| 2013/0126549 A1 | * | 5/2013 | Ader ..................... A47K 10/24 221/96 |
| 2013/0206789 A1 | | 8/2013 | Van Diepen et al. |

FOREIGN PATENT DOCUMENTS

| | | |
|---|---|---|
| DE | 3535330 A1 | 4/1987 |
| DE | 29610683 U1 | 6/1996 |
| DE | 19846375 A1 | 4/2000 |
| DE | 20305272 U1 | 9/2003 |
| DE | 102010036072 A1 | 3/2012 |
| DE | 202011105459 U1 | 3/2012 |
| EP | 0744147 B1 | 5/2003 |
| FR | 2238457 A1 | 2/1975 |
| WO | WO 2007/070898 A1 | 6/2007 |

* cited by examiner

WET/DRY SHEET DISPENSER WITH DISPENSING CUP

FIELD OF THE INVENTION

The present invention relates to devices suitable for dispensing sheet products and more particularly to such devices which allow the user to select whether the sheets will be wet or dry at the point of use.

BACKGROUND OF THE INVENTION

Sheet dispensers are well known in the art. Some dispensers allow the user to dispense liquid in conjunction with dispensing sheets from the dispenser. Exemplary art is shown by U.S. Pat. Nos. 3,804,061; 4,436,224; 4,667,846; 4,798,312; 5,671,872; 5,762,710; 5,819,989; 6,138,874; 6,431,405; 7,018,473; 7,318,949; 7,850,041; 8,006,864; 2008/00117882; 2009/0302049; 2010/0032443; 2011/0315715; 2013/0126549; 2013/0206789 and DE 202011105459. But these attempts do not necessarily dispense the liquid directly to the sheet, potentially leading to inconvenience for the user.

Attempts to dispense the liquid directly to the sheet are found, for example, in U.S. Pat. Nos. 3,865,271; 4,106,433; 4,620,502; 4,74,7,365; 5,433,084; 5,672,206; 5,829,278; 5,887,759; 6,059,882; 6,319,318; 6,343,491; 6,431,111; 6,457,434; 6,497,345; 6,547,881; 6,613,144; 6,918,513; 7,185,841; 7,654,412; 7,856,941; 7,784,424; 2007/0272701; 2009/0031952; 2009/0032636; 2011/0088619; WO 200035327; WO 200587068; WO 2007070898; EP 1017303; EP 0744147; CN 2172081; CN 101156755; DE 29610683; DE 3535330; DE 19846375; DE 102010036072; DE 202011105459; DE 20305272; and FR 2238457. As can be seen, some of these attempts rely upon rollers or other means of direct contact of some portion of an apparatus with the sheet. Yet other attempts purportedly spray the liquid onto the sheet.

Yet other attempts provide for pumping of the liquid to an indented top and/or actuator top, as shown in U.S. Pat. Nos. 7,578,388; 7,740,154; 7,712,633; 7,726,517; 7,871,217; 7,963,425; 7,984,832; 20080273915; 20090001099; 20090101676 and 20140034680.

A dispenser which allows for convenient sheet refill and for wet and dry sheets to be dispensed with contact with the apparatus is needed. But such an apparatus, without more, is not sufficient to meet everyday needs. Convenient refill of the liquid is also needed. And the dispenser must provide for convenient operation and a suitable liquid pattern on the sheet when a wet sheet is desired and prevent premature wetting of sheets not being used.

SUMMARY OF THE INVENTION

In one embodiment the invention comprises a refill for use in a sheet dispenser. The refill has a longitudinal axis defining a longitudinal direction. The refill comprises a reservoir having a hollow elongate body and an open neck. A valve is disposed in the neck and in fluid communication with the reservoir, whereby the valve can dispense liquid contained in the reservoir upon demand. A pump is juxtaposed in operable relationship with the valve and operates by compression in a longitudinal direction to dispense liquid from the reservoir to a dispensing cup. The dispensing cup may be disposed above the sheets. The refill fits in a base. The base can hold and selectively dispense sheets upon demand. The base has a fitting juxtaposed with and in operable relationship with the valve. The fitting provides for the refill to be removably disposed in the base.

In another embodiment the invention comprises a dispenser having such a refill installed or installable therein. The refill may be filled with a liquid as presented to the user and/or may be refilled at the point of use without removing from the base.

DETAILED DESCRIPTION OF THE INVENTION

Figure 1A:
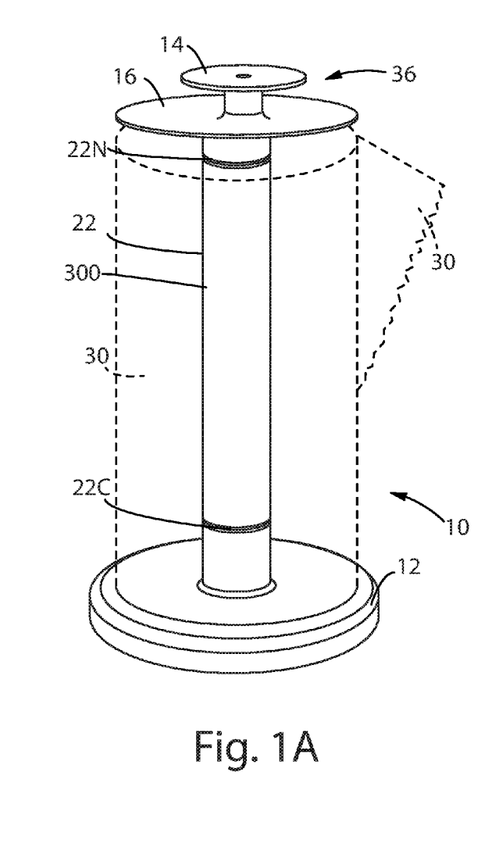
FIG. 1A is a perspective view of a dispenser according to the present invention having a roll of sheets thereon and an optional shield, both shown in phantom.
Figure 1B:
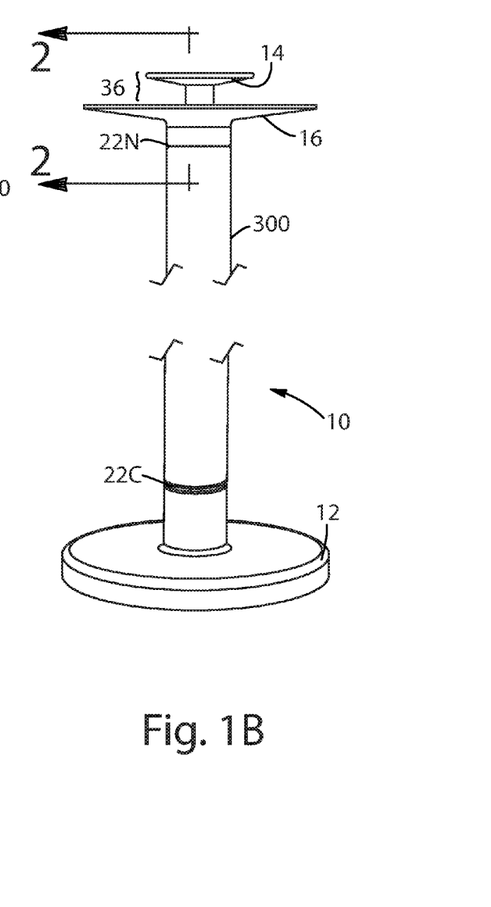
FIG. 1B is a side elevational view of the dispenser of FIG. 1A, without the sheets.

Referring to FIGS. 1A-1B, in one embodiment the invention comprises a refill (20) usable in combination with, and as a component of, a portable sheet (30) dispenser (10). The dispenser (10) comprises the refill (20) and a base (12). The refill (20) may be removably disposable in and usable in conjunction with the dispenser (10). The refill (20) further comprises a reservoir (22) for holding a liquid therein and an upwardly facing cup (14) for receiving liquid dispensed from the reservoir (22). As used herein, the terms up, upwards, down, above, below, beneath and the like refer to the orientation of the refill (20) and/or dispenser (10), or components thereof sitting when on a horizontal surface, such as a countertop.

The dispenser (10) accepts a clip of sheets (30), which are later dispensed as needed. The dispenser (10) may further comprise a base (12) which acts as a frame for the remaining components, and may also comprise an external cup (14). The cup (14) disposes a shield (16) in a predetermined position for spraying liquid from the reservoir (22) onto the sheet (30) in a predetermined pattern. The base (12) may optionally comprise a spindle [not shown] or stub for supporting the sheets (30)/refill (20).

The sheets (30) may be core wound as shown. Or the sheets (30) may be interfolded, as shown in commonly assigned U.S. Pat. No. 7,762,426, particularly FIGS. 4A-4E, or may be adhesively joined as shown in commonly assigned U.S. Pat. No. 5,520,308, particularly FIGS. 3A-3E. Either such configuration may provide pop up dispensing of the sheets (30). The base (12) may have a tab to help separate successive sheets (30) as shown in commonly assigned U.S. Pat. No. 5,810,200. The base (12) may optionally comprise a clip (not shown). The clip may be cantilvered from the base provide spring force against the sheets (30).

Figure 1C:
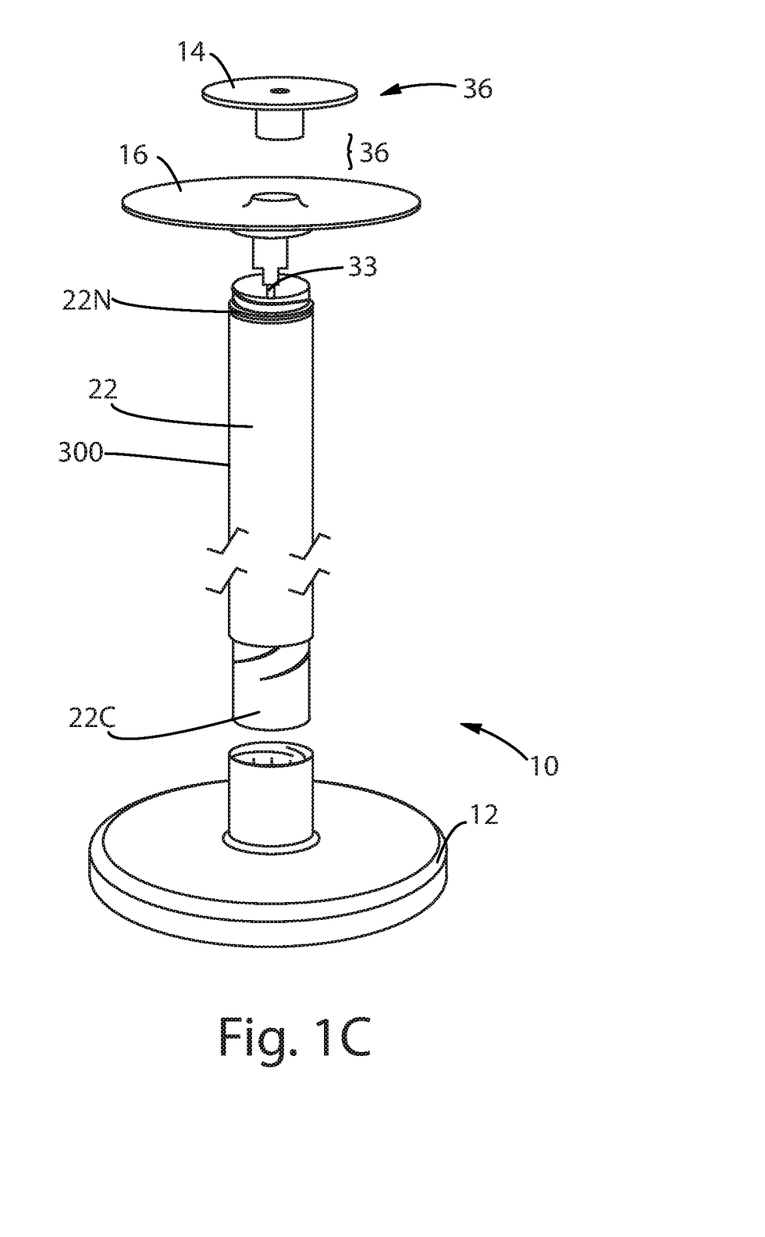
FIG. 1C is an exploded perspective view of the dispenser of FIG. 1B.

Referring to FIG. 1C, the refill (20) may be removably joined or coupled to the base (12). Particularly, a valve in the refill (20) may be fluidly coupled to a fitting in the base (12), so that liquid may communicate from the reservoir (22) in the refill (20) to and through the shield (16) in the cup (14).

A pump (28) is activated by the user, to selectively dispense liquid from the reservoir (22) through the valve in the refill (20) and into the cup (14). The liquid is dispensable upon demand by a user from the shield (16) in the cup (14) to one or more sheets (30).

Referring to FIGS. 1A-1C, and examining the invention in more detail, the sheets (30) may be core wound, as is known in the art. The sheets (30) may comprise cellulose and/or synthetic fibers, as known. The sheets (30), and particularly sheets (30) comprising cellulose, may be usable as bath tissue, facial tissue, paper toweling, dish washing sheets (30), toilet paper, other hygienic sheets (30), etc. Sheets (30) comprising synthetic nonwoven materials may be usable as solid/soft surface wipes, floor cleaning sheets (30), baby wipes, facial wipes, dryer added fabric enhancers, etc. Cellulosic sheets (30) may be made with discrete or continuous high density regions, as part of the drying process. More particularly, cellulosic sheets (30) may be made according to commonly assigned patents: U.S. Pat. Nos. 3,974,025; 4,191,605; 4,239,065; 4,529,480; 4,637,859; 5,364,504 and/or 5,529,664. Synthetic nonwoven sheets (30) may be hydroentangled to impart texture, carded, spunbond, etc., as are known in the art. Synthetic nonwoven sheets (30) may have latex, mechanical bonds and/or thermal bonds to impart desired physical properties. More particularly, synthetic sheets (30) may be made according to commonly assigned patents: U.S. Pat. Nos. 6,101,661; 6,645,604; 6,651,354, and optionally contain absorbent gelling materials as described in commonly assigned U.S. Pat. No. 5,960,508. Any of the aforementioned sheets (30) may comprise a single layer or a laminate of plural like or different layers. The sheets (30) may be pre-wetted. A pre-wetted sheet (30) may be made according to commonly assigned U.S. Pat. No. 6,716,805.

While a core wound plurality of sheets (30) is shown, one of skill will recognize that the invention is not so limited. The sheets (30) may be horizontally stacked or disposed in an inverted U-shape, as are known in the art. The sheets (30) may be vertically stacked as shown in commonly assigned U.S. Pat. No. 7,762,426, FIG. 2 and column 7, lines 18-30. The sheets (30) may be interleaved/separably joined, e.g. with adhesive, as shown therein at FIGS. 4A-5E and columns 7, lines 31-65. The sheets (30) may be joined together with perforations. All such forms of sheet (30) dispensing are known, usable with, and not critical to the claimed invention. One of skill will recognize that the refill (20) may be sold with or without the liquid and/or with or without the sheets (30).

The sheets (30) may be dry or may be pre-wetted with a first liquid. Another liquid may be dispensed onto the dry or pre-wetted sheet (30) at the point of use. The liquid usable with the present invention may be aqueous, contain alcohol, solvents, surfactant, perfumes, disinfectants, etc. The liquid may be usable as a hard/soft surface cleanser, particularly a dish cleanser, fabric cleanser, disinfectant, germicide, bactericide, insect repellant, etc. Optionally, the sheets (30) may contain a dry chemistry which is activated when the liquid is dispensed onto the sheet (30). This arrangement provides the benefit that efficacy is not depleted and remains available at the point of use. Optionally, the reservoir (22) may contain two or more liquids which are kept separate until intermixed at the point of use.

Figure 2A:
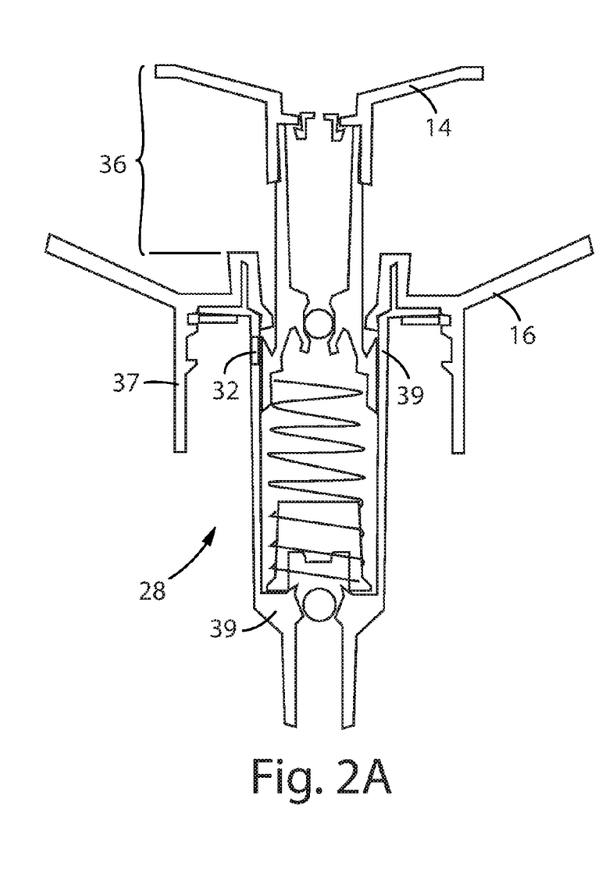
FIG. 2A is a vertical sectional view, taken along line 2-2 of FIG. 1B, showing the refill actuator in the standby position.
Figure 2B:
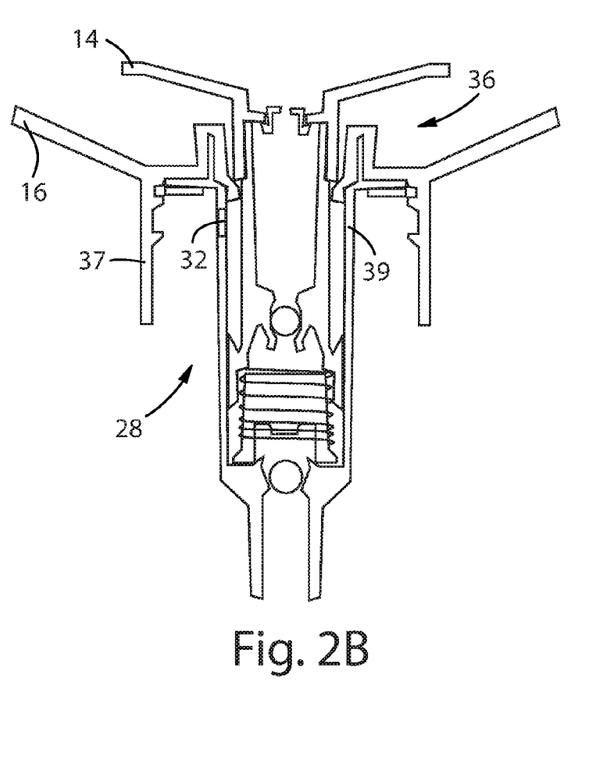
FIG. 2B is a vertical sectional view, of the dispenser of FIG. 2A showing the refill actuator in actuated in the dispensing position.

Referring to FIGS. 2A-2B, the cup (14) may provide dual functionality as an actuator (36). The cup (14) is normally in a standby position, with the actuator (36) extended. The user depresses the cup (14) to an actuated position, draws liquid from the reservoir (22) upwardly into the cup (14). The cup (14) may particularly function as an actuator in response to manual compressive force applied thereto by the user, causing the cup (14) and optionally the shield (16) to vertically reciprocate towards and away from the base (12) and thereby operate the pump (28).

The portable refill (20) may be shipped and sold with the actuator (36) locked in the dispensed position. This arrangement prevents the pump (28) from inadvertently dispensing liquid during transport, storage and while on display for sale. The dispenser (10) may optionally be locked when not in use, to provide for child resistance and minimize spilling when the dispenser (10) is moved between rooms. One form of lock is a rotatable lock, as are found in U.S. Pat. Nos. 5,445,299 and 6,543,649.

The refill (20) of the present invention need not be freestanding. This arrangement avoids the problems of the art, where the refill requires sufficient geometry, and associated cost, to prevent the refill (20) from falling over on the counter and during use. Instead, the refill (20) of the invention may be permanently or removably attached to a base (12). The base (12) can be re-used, minimizing cost.

An optional check valve, such as a ball valve, silicon disc, etc., may minimize or prevent liquid from prematurely flowing back into the reservoir (22). This arrangement keeps the liquid in the cup (14) so that the user can blot it with the sheet (30) or otherwise dispense the liquid onto the sheet (30) as needed at the point of use. A return spring may bias the actuator (36) from the actuated position back to the standby position.

If desired, the user may tip the portable dispenser (10), to pour or drip the liquid directly onto the countertop or other target surface to be cleaned or otherwise treated. In such an embodiment the cup (14) may have an optional spout, to facilitate pouring.

FIGS. 2A-2B show the pump (28) may be contained in the refill (20). The pump (28) may be juxtaposed with, and, in a degenerate case, disposed in, the neck (22N) of the refill (20). The pump (28) may dispense liquid through the cup (14) in response to longitudinal actuation of the refill (20), i.e. pushing upon the refill (20) to apply compressive force directed to the base (12), as indicated by the arrow in FIG.

2B. The pump (28) may comprise an inlet valve, compression chamber and discharge valve as known in the art. Compressive pressure applied to the liquid may force that liquid through the pump (28) system under pressure and into the cup (14), as indicated by the arrow in FIG. 2B. A suitable pump may be made according to the teachings of U.S. Pat. No. 4,986,453.

An optional return spring brings the pump (28) back to a starting position when the user applied force is released. The pump (28) may provide a constant dose of liquid each time it is activated. Alternatively, the pump (28) may be adjustable as is known in the art to provide a larger or smaller dose as desired.

The pump (28) may have an axial displacement, manifested as a stroke of 0.3 cm to 10 cm, and particularly 0.5 to 5 cm, under user applied manual actuation force. The pump (28) may dispense at least 0.1, 0.5, 1 or more cc of liquid upon each actuation and may dispense not more than 10, 5 or 4 cc with each dose. The actuation force may range from 5 to 40N, particularly in the downward vertical direction. The pump (28) may have a discharge force of 10 to 40 N. The liquid may have a viscosity of at $10 \text{ s}^{-1}$ of 1 to 100, 500 or 1000 cps, or 100-200 cps to accommodate typical dish washing liquids. A pump (28) providing these performance properties with such a liquid has been found advantageous for dispensing, e.g. dish washing liquids, so that the present invention may be advantageously and conveniently used in the kitchen.

Viscosity is determined by conventional methods, e.g. using an AR 1000 rheometer from TA Instruments of New Castle, Del. using a standard-size aluminum DIN or double wall concentric cylinder. The high shear viscosity at $10 \text{ s}^{-1}$ is obtained from a logarithmic shear rate sweep at 20° C. The procedure consists of two steps including a pre-conditioning and a flow ramp up step. The pre-conditioning step is a pre-shear at $10 \text{ s}^{-1}$ and 20° C. for 30 sec. The flow ramp up follows immediately and consists in shearing the sample at increasing shear rates in steady state flow mode from 0.1 to $1000 \text{ s}^{-1}$, for 5 points per decade on a logarithmic scale, allowing measurements to stabilize for a period of from 5 s for up to 1 min with a tolerance of 5 percent. The logarithmic plot of the viscosity vs. shear rate of the flow ramp down experiment is used to determine the high shear viscosity at $10 \text{ s}^{-1}$.

Figures 3, 4A, 4B:
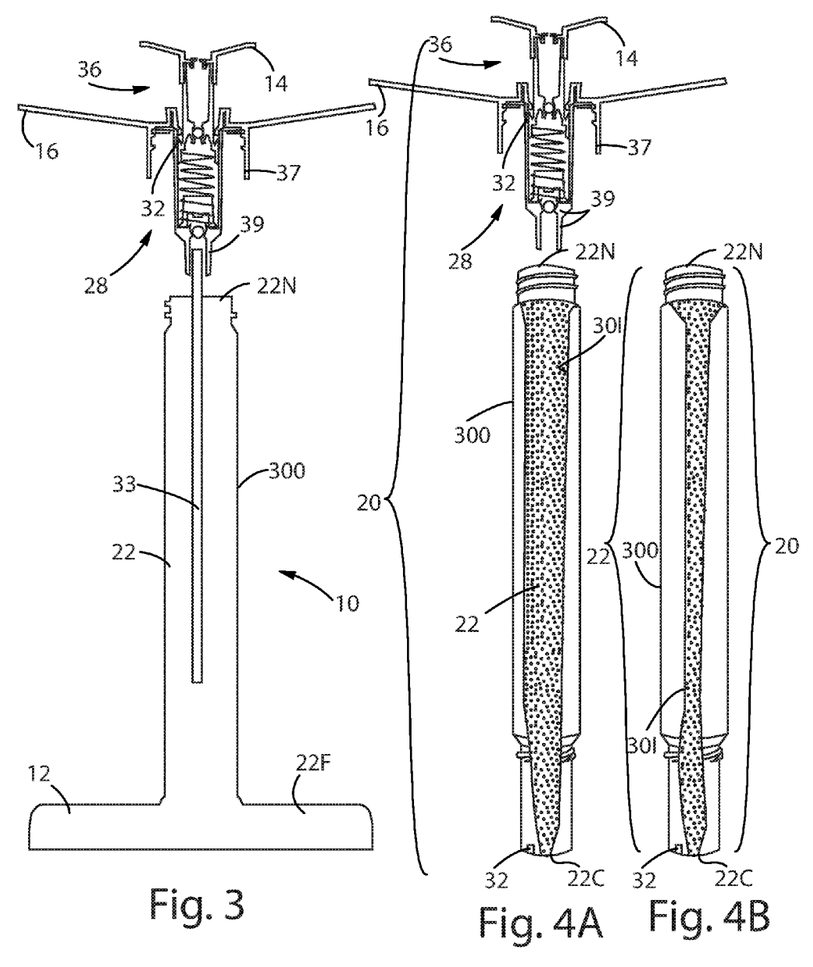
FIG. 3 is a vertical sectional view of a partially exploded alternative embodiment of the refill and dispenser according to the present invention and having an enlarged reservoir with a lower flare, showing the refill with a dip tube and separated from the base.
FIG. 4A is a side elevational view of an alternative embodiment of the refill according to the present invention shown partially in cutaway and having a delaminating wall, showing the actuator and reservoir separated.
FIG. 4B is a side elevational view of the refill of FIG. 4A, shown partially in cutaway, having the inner wall partially delaminated, after depletion of some liquid from the reservoir, with the actuator omitted for clarity.

Referring to FIG. 3, the refill (20) may be elongate, axi-symmetric having a vertical axis. The refill (20) may comprise a hollow body which acts as a reservoir (22) to contain at least 10, 20, or 25, but not more than 350, 300, 200, or 100 cc of liquid therein. One end (22C) of the body may comprise a closed or closable end (22C). The other end (22C) of the body may comprise an open neck (22N), through which liquid may be dispensed. The closed end (22C) may be disposed above a discharge valve (18), to provide for easy, one handed operation as described herein. The dispenser (10) further comprises a pump (28), which may be disposed in the refill (20) or on the dispenser (10) base (12). Optionally the base (12) may comprise an axially coincident spindle and the refill (20) fit complementary thereon for stability. The entire refill (20) may be rigid, the body thereof may be rigid, or the body may flex in response to axially applied loads used to activate the pump (28).

The body of the refill (20) may be made of plastic, such as PET, or metal, etc. The refill (20) may have a total length of at least 10, 15 or 20 cm, and not more than 50, 40 or 30 cm, and comprise any suitable cross section as measured from the top of the base (12) to the bottom of the actuator (36), cup (14) or shield (16). The cross section may be constant, stepped, variable, concentric and/or eccentric about the longitudinal axis. If a round cross section is selected, it may have a nominal outside diameter of about 2 to about 6 cm, and particularly about 3 to about 5 cm. It is prophetically believed found that a refill (20) having a nominal outside diameter of about 3 to about 5 cm, particularly about 4 cm and a length of about 20 to about 35 cm and particularly about 28 to about 30 cm is particularly well suited for the vast majority of commercially available core wound paper toweling. It is understood that a round cup (14) includes geometries which approximate a circle, but have irregular, scalloped or toothed and crenulated edges.

If a non-round cross section is selected, it may have a major dimension corresponding to the diameters set forth above. As used herein, the major dimension is the greatest dimension of that cross section, for example, the major axis of an ellipse, the diagonal of a square/rectangle, etc. It is understood that the major dimension of the cross section will generally, but not exclusively, control the size and shape of a core of sheets (30) which may be installed on the refill (10). It is further understood most cores of core-wound sheets (30) are round and a complementary refill (10) cross section would likewise be round and complementary to provide for easy and convenient installation and removal of the roll of sheets (30) onto the refill (10).

The base (12) and refill (20) may fit together through a lock and key system as is known in the art. This arrangement minimizes the likelihood of an improper refill (20) being used, potentially reducing damage and/or leakage. The refill (20) may have a separate lock and key system to prevent replenishing liquid therein from an improper or undesirable supply. This arrangement provides the benefit that the user does not inadvertently use the wrong cleanser. For example, the refill (20) may have a lock and key system which is common to both the base (12) and to replenishment from an external supply. A particular complementary thread system, such as illustrated cap (37) or a bayonet fitting may be utilized, as are known in the art.

The refill (20) may be filled with the liquid as presented to the user. When the refill (20) is depleted, it may be discarded and replaced with a refill (20) having a fresh supply of liquid. Alternatively, the refill (20) may be replenished with liquid from a separate supply by the user. The body may further comprise a vent (32), as known, to prevent drawing a vacuum upon dispensing. A headspace may be disposed above the liquid if an embodiment utilizing a dip tube (33) is selected.

Referring back to FIGS. 1A-1C, the cup (14) may be external to and above the base (12) and reservoir (22). The cup (14) may be flat or upwardly concave to hold liquid dispensed thereto. Liquid may be dispensed upwardly through a stem (39). The stem (39) may be concentric to and centered within a round cup (14), as shown or may be eccentrically disposed in the cup (14). A round cup may have a diameter ranging from 3, 4, or 6 to 8, 10, 12 or 15 cm and a depth ranging from 0, 1, 2 to 8, 10, 15 or 20 mm.

Alternatively the cup (14) may be generally elliptical, to conform to the shape of the hand/fingertips as a sheet (30) is applied to the cup (14) to receive liquid therefrom or may be any other shape as desired. A elliptically shaped cup (14) may have an aspect ratio of major axis to minor axis ranging from 2:1 or 3:1 up to 6:1 and even 10:1. The major axis may range from 4 to 10 cm, with a minor axis ranging from 2 to 8 cm If desired, the cup (14) may have plural nozzles. Prophetically this arrangement provides for greater distribution of the liquid onto the sheet (30) at the point of use. If desired, the cup (14) may have one or more liquid permeable membranes in addition to or in place of the nozzle at the bottom of the cup (14). This arrangement allows the user to touch the sheet (30) to the permeable membrane, thereby wetting the sheet (30). If desired, the cup (14) may have a mesh or other aerating element, to provide for foaming of the liquid.

While a cup (14) having a generally horizontal orientation is shown, the invention is not so limited. The cup (14) may be canted off of the vertical axis, so that liquid preferentially puddles on one side of the cup (14) without spilling beyond the edge. This arrangement prophetically provides the benefit of concentrating the liquid for easier dispensing onto the sheet (30).

The refill (20) have one or more shields (16), to provide for capture of the liquid spilled from the cup (14) and/or the sheet (30). This arrangement advantageously prevents spilled liquid from damaging the clip of remaining sheets (30), making a mess on a countertop, etc. The shield (16) may be disposed intermediate the cup (14) and reservoir (22). The shield (16) may be part of the actuator (36) or may be mounted independently thereof, as shown.

The shield (16) may be larger than and congruent with the cup (14). A round shield (16) may have a diameter of 4 to 30 cm. The shield (16) may be of any shape and sized to protect the edges of the roll of sheets (30) prior to first use thereof. For example, a shield (16) having a diameter of 22 cm may be used with a 20 cm diameter roll of sheets (30). The shield (16) may be disposed 0.5, 1, 3, 5, 7, 10 or more cm above the upper edge of the sheets (30) when installed in the dispenser (10).

The bottom of the shield (16) may circumscribe the stem (39) through which liquid is dispensed. The shield (16) may be upwardly concave to hold liquid captured therein.

Optionally the shield (16) and/or the cup (14) may have a return drain. The drain allows liquid captured in the shield (16) to drain back into the reservoir (22). The drain may be closed when the actuator (36) is in the standby position, to minimize evaporation of the liquid. The drain may be open when the actuator (36) is temporarily in the actuated position, to allow liquid to drain, preventing overfill of the shield (16) and/or cup (14). The return drain may comprise a hole in the refill (20), particularly the body of the reservoir (22) which is covered and uncovered as the actuator (36) moved between the standby position and actuated position, respectively. The optional drain may be omitted if one is concerned that returned liquid will contaminate the reservoir (22).

Referring to FIG. 3, the reservoir (22) may have a flare (22F) juxtaposed with the base (12), partially surround or completely circumscribe the longitudinal axis and/or extend radially outward therefrom. The flare (22F) may provide for increased reservoir (22) volume, storage of two phase or immiscible liquid supply, etc. This arrangement provides the benefit of increased stability, by lowering the center of gravity when there is liquid within the reservoir (22). The flare (22F) may optionally be concentric the longitudinal axis, for balance.

Prophetically, the flare (22F) may be at the top of the refill (20). This arrangement provides the benefit that the sheets (30) may be more securely held in place. Such a flare (22F) may be upwardly convex, so that the flare (22F) provides dual functionality as both a flare (22F) and shield (16) and/or cup (14).

FIG. 3 further shows an optional dip tube (33). The optional dip tube (33) may be used to transport liquid from the bottle of the reservoir (22) upwardly to the cup (16).

Referring to FIGS. 4A-4B, if one wishes to avoid using a dip tube (33), a reservoir (22) having an reservoir (22) with an inner delaminating wall (30I) may be used. The inner delaminating wall (30I) may be flexible and collapse in response to dispensing of liquid from the reservoir (22). The inner wall (30I) may comprise flexible film, such as PET, as is known in the art.

The outer wall (30O) of the reservoir (22) may be rigid, to provide a frame for holding the other components of the refill (20) in proper position during both standby and dispensing. The outer wall (30O) of the refill (20) may be made of thermoplastic polymers or copolymers such as PET, PP, PE, EVOH and/or mixtures thereof and/or multi-layers thereof and/or engineering plastics such as ABS, polyamides, POM and/or aluminum or other metals.

This arrangement prophetically provides the benefit that the reservoir (22) can be discarded when the contents are depleted, minimizing mess when a new reservoir (22) is installed in the dispenser (10). A vent (32) may be provided between the inner wall (30I) and outer wall (30O), to allow for easier delamination and collapse of the inner wall (30I).

Optionally, the rigid outer of wall (30O) of the reservoir (22) may be retained and reused. The inner wall (30I) may be discarded when depleted, and replaced with a new inner wall (30I) having a fresh supply of liquid.

Figure 5A:
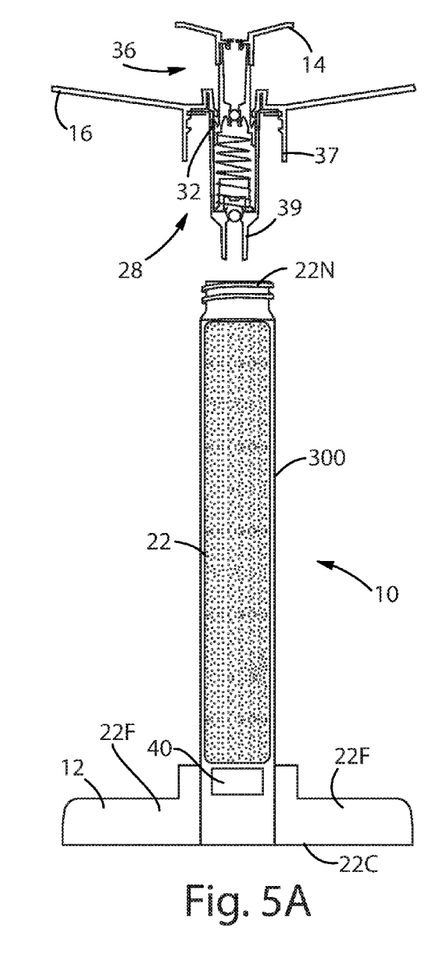
FIG. 5A is a vertical sectional view of an alternative embodiment of the refill according to the present invention and having a piston, showing the actuator and reservoir separated.
Figure 5B:
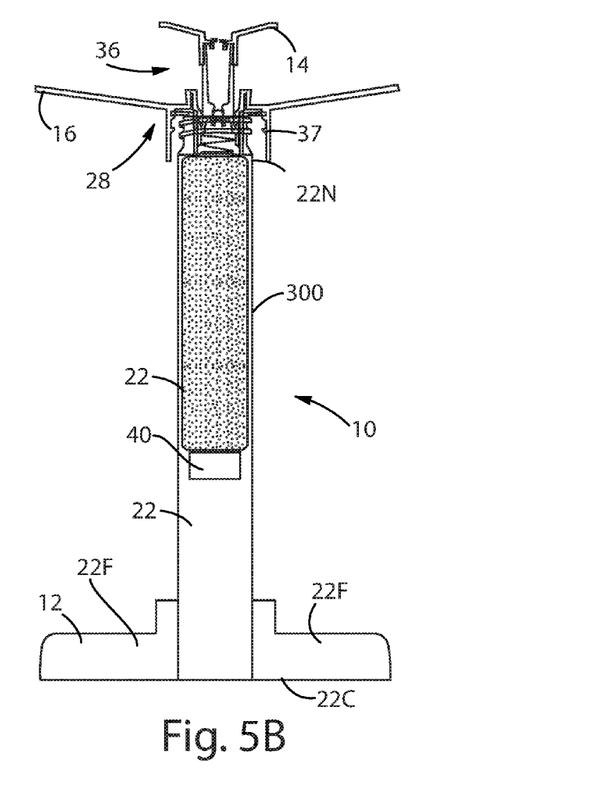
FIG. 5B is a vertical sectional view of the refill of FIG. 5A, showing the inner wall partially piston partially elevated, after depletion of some liquid from the reservoir, showing the actuator and reservoir assembled.

Referring to FIGS. 5A-5B, the refill may comprise a piston (40) to expel liquid from the reservoir (22). As liquid is dispensed from the reservoir (22) to the cup, the piston (40) rises upwardly to dispense the next charge of liquid in response to user actuation of the pump (28). This arrangement provides the benefit that the reservoir (22) and base (12) may be molded as a single piece, prophetically reducing production costs.

Figure 6A:
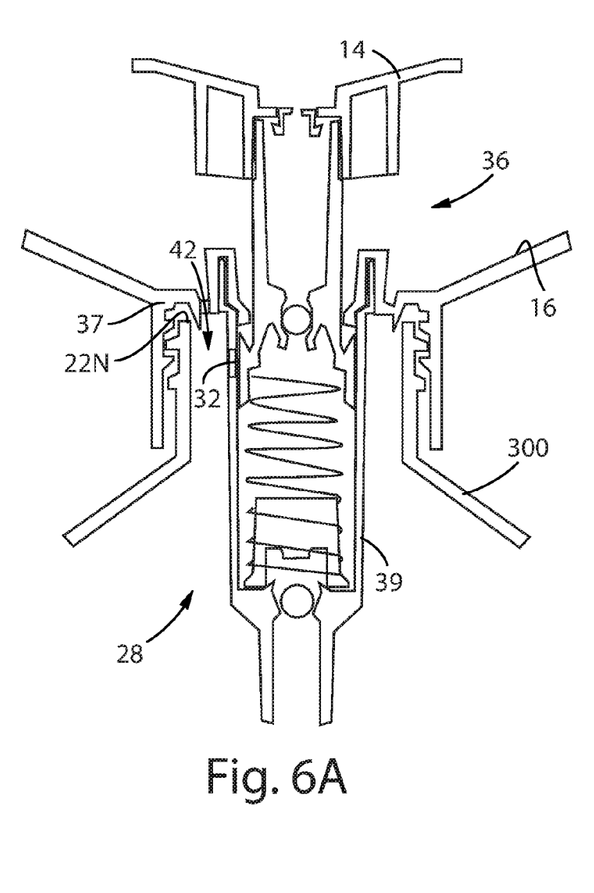
FIG. 6A is a fragmentary vertical sectional view of an exemplary pump, in the standby position and showing an optional drain, the drain being open.
Figure 6B:
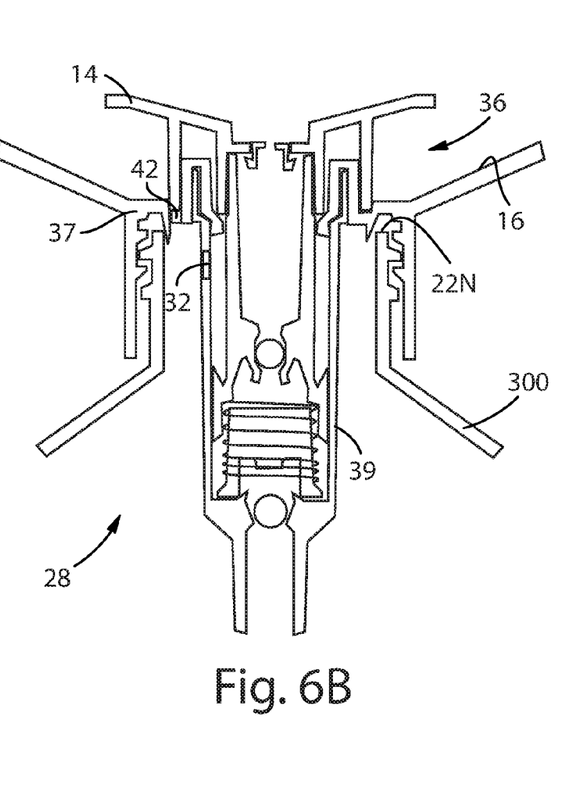
FIG. 6B is a fragmentary vertical sectional view of the pump of FIG. 6A showing the refill actuator in the dispensing/locked position, with the drain closed.

Referring to FIGS. 6A-6B, the pump (28) may comprise an optional cap (37) to removably join the pump (28) and/or cup (16) to the neck 22N of the refill (20). This arrangement provides the benefit that the reservoir (22) may be easily replaced or refilled, as desired.

FIGS. 6A-6B show an optional drain (42). The drain (42) allows for liquid spilled into the shield (16) to be returned to the reservoir (22) in the direction of the arrow. This arrangement prophetically provides the benefit that liquids captured by the shield (16) are prevented from spilling and may be re-used upon further dispensing. The drain (42) may be uncovered and covered during actuation of the pump (28) by vertical displacement of the cup (14), as shown. While FIGS. 6A-6B show a drain (42) which is open in the standby position and closed in the dispensing/locked position, the invention is not so limited. The open and closed states of the drain (42) may be reversed, so that drain (42) may be closed in the standby position and open in the dispensing/locked position.

FIG. 6A particularly shows an open drain (42) with the actuator (36) in the standby position. This arrangement allows for long term return of spilled liquids, should the liquid be viscous or sticky and not immediately return to the reservoir (22).

FIG. 6B shows the actuator (36) in the locked/dispensing position and a closed drain (42). This arrangement allows for long term containment and retention of liquids. For example, during transport, storage and while on display for sale having the drain (42) closed reduces evaporation and prevents spillage through the drain hole.

The drain (42) may be separate from the stem and/or nozzle[s] which deliver fluid from the pump (28). This arrangement provides the benefit that, for example, the stem (39) may be used to dispense liquid to the cup (14) and the drain (42) may be independently used to remove liquid from the shield (16) or vice versa. Alternatively, the cup (14) and/or shield (16) may have both a dedicated liquid delivery stem (39) and a dedicated drain (42).

Prophetically, if desired, the longitudinal axis may be disposed generally horizontal. This arrangement provides the benefit that the dispenser (10) may be wall mounted or fit into other spaces without requiring a countertop. Prophetically the amount of the dose from a discrete operation of the pump (28) may be varied in known fashion to provide a smaller or larger discrete and predetermined dose.

If desired, the dispenser (10) may have a handle on the side to facilitate carrying. If desired the dispenser (10) may have a spray manifold, in addition to the cup (14). A suitable spray manifold is disclosed in commonly assigned P&G Case 13200, application Ser. No. 14/151,937.

The pump (28) could be powered by an electric motor if desired. The electric motor could be battery powered or powered by an AC outlet. The pump (28) could be triggered by a motion sensor or proximity sensor, as disclosed in 2013/0206789, particularly para. 19. If desired, the refill (20) may contain two, three or more reservoirs (22) of liquid. This arrangement provides flexibility for the user to select a different liquid for different needs, e.g. lotion for application from the sheet (30) to the skin, polish to protect a shoe, anti-bacterial cleanser for a countertop, a different perfume, etc.

In use, the user grasps a sheet (30) with one hand and removes it from the supply of sheets (30) disposed on the dispenser (10). The user may grasp a plurality of sheets (30), if desired. The user's other hand is free, if wetting is desired, to activate the pump (28). If pump (28) activation is desired only a single hand is needed to axially activate the pump (28) by compression thereof towards the base (12). The pump (28) action requires action in only a single, longitudinal direction for selective wet/dry dispensing.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

All documents cited in the Background and in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to the term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A refill for use as a core of a core wound sheet dispenser, said refill having a longitudinal axis defining a longitudinal direction, said refill comprising:
    a reservoir, said reservoir comprising a hollow elongate body suitable for containing a liquid therein and an open neck, at least a portion of said reservoir having a cross section with a major cross sectional dimension of about 2 to about 6 cm and having a length of about 10 to about 50 CM;
    a generally upwardly facing cup in fluid communication with said reservoir, whereby liquid in said reservoir can be dispensed to said cup, wherein said cup acts as an actuator in response to user applied compressive force manually applied thereto;
    a pump operable to dispense liquid from said reservoir to said cup upon selective operation of said pump, for later application of said liquid onto a sheet dispensable from said core wound sheet dispenser and
    a shield intermediate said actuator and said reservoir, wherein said shield is larger than said upwardly facing cup.

2. A refill according to claim 1 wherein said reservoir has a bottom which fits into a complementary base and a top longitudinally remote therefrom, said upwardly facing cup being removably attachable to said top of said reservoir.

3. A refill according to claim 1 wherein said shield is congruent to said upwardly facing cup.

4. A refill according to claim 3 wherein said refill further comprises a normally closed check valve, said check valve being openable in said longitudinal direction upon operation of said pump, thereby preventing re-entry of liquid from said cup to said reservoir.

5. A refill according to claim 1 having a longitudinal dimension of 10 to 50 cm and wherein said pump has a longitudinal stroke of 0.5 to 5 cm and/or wherein said pump has a net discharge force of 10 to 40 N.

6. A refill according to claim 1 having a round cross section with a nominal outside diameter of 3 to 5 cm and a length of 28 to 30 cm to be insertable in a core of rolled sheets.

* * * * *